US010369682B2

(12) United States Patent
Stoneback et al.

(10) Patent No.: US 10,369,682 B2
(45) Date of Patent: Aug. 6, 2019

(54) SPINDLE AND TOOL HOLDER REFINISHER

(71) Applicants: John Wayne Stoneback, Madison, OH (US); Craig Fischer, Hamden, OH (US)

(72) Inventors: John Wayne Stoneback, Madison, OH (US); Craig Fischer, Hamden, OH (US)

( * ) Notice: Subject to any disclaimer, the term of this patent is extended or adjusted under 35 U.S.C. 154(b) by 401 days.

(21) Appl. No.: 14/966,654

(22) Filed: Dec. 11, 2015

(65) Prior Publication Data

US 2016/0199965 A1    Jul. 14, 2016

Related U.S. Application Data

(60) Provisional application No. 62/091,156, filed on Dec. 12, 2014.

(51) Int. Cl.
*B24B 5/40* (2006.01)
*B24D 9/04* (2006.01)
*B23B 31/00* (2006.01)

(52) U.S. Cl.
CPC ............. *B24D 9/04* (2013.01); *B24B 5/40* (2013.01); *B23B 31/006* (2013.01)

(58) Field of Classification Search
CPC .......... B24D 9/04; B24B 5/40; B23B 31/006
USPC .................... 451/51, 61, 557, 430
See application file for complete search history.

(56) References Cited

U.S. PATENT DOCUMENTS

| | | | | | |
|---|---|---|---|---|---|
| 1,510,812 | A | * | 10/1924 | Weinert, Jr. | B23C 3/05 451/430 |
| 1,903,533 | A | * | 4/1933 | Preston | B23C 3/05 279/102 |
| 2,022,821 | A | * | 12/1935 | Ostman | B24B 15/00 451/430 |
| 2,748,547 | A | * | 6/1956 | Davies | B24B 15/00 451/430 |

* cited by examiner

*Primary Examiner* — Robert A Rose
(74) *Attorney, Agent, or Firm* — Tarolli, Sundheim, Covell & Tummino LLP

(57) ABSTRACT

An apparatus and method for refinishing a tapered surface of a machine tool component. The apparatus includes a head defining at least three tapered segments which are configured to conform precisely to the taper of the machine tool component being refinished. Each segment includes a surface for receiving an abrasive strip, the surfaces configured to conform and confront a conical surface of a taper to be refinished. The head is adapted to engage the tapered surface of the machine tool component so that upon rotation of the head, the abrasive strips abrade the conical surface of the component. A head for refinishing a spindle bore includes three outwardly extending segments whereas the head for refinishing a tool holder shank surface includes three segments extending between annular portions, each segment having an inner tapered surface for receiving the abrasive strips.

17 Claims, 4 Drawing Sheets

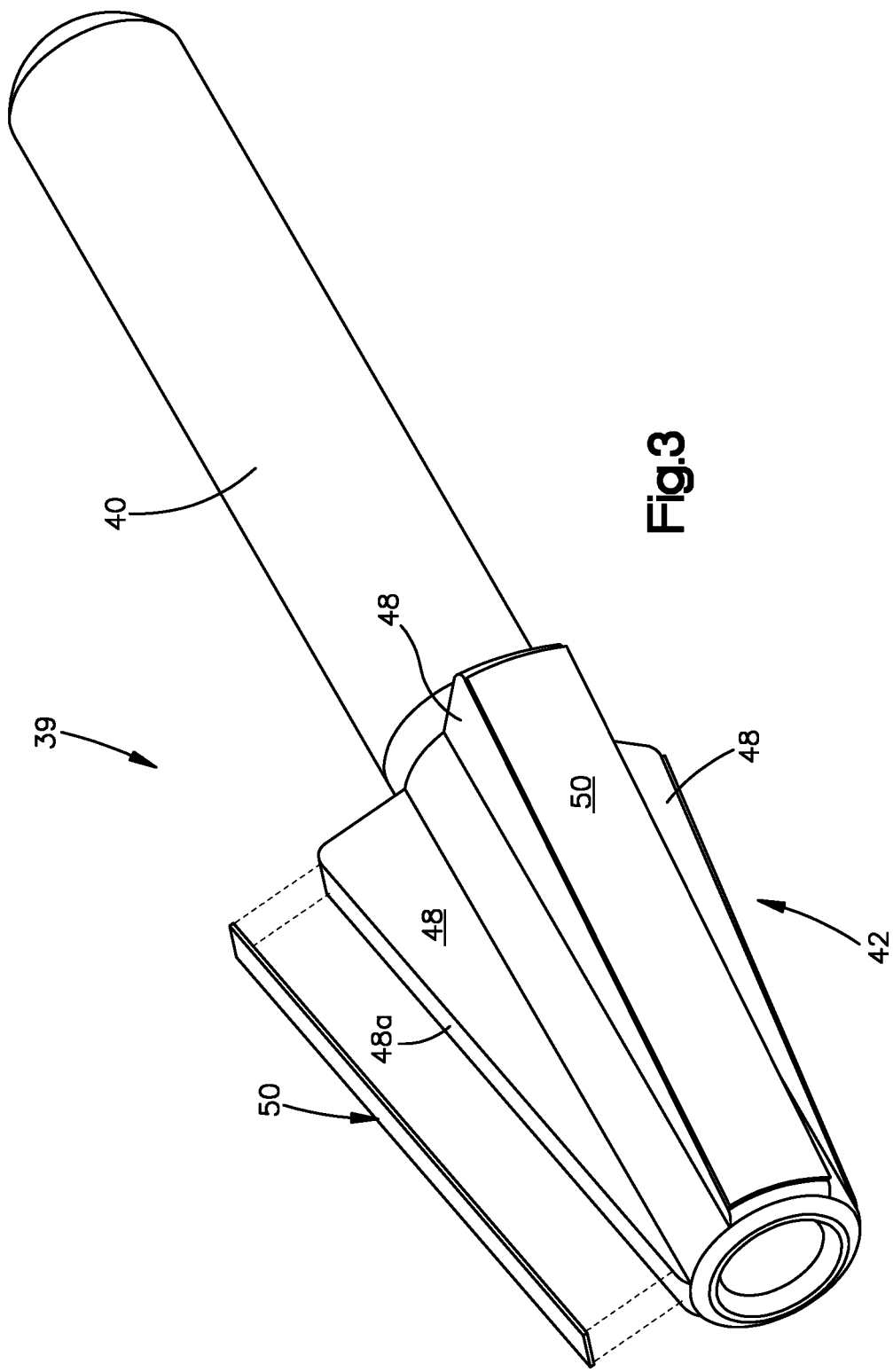

SPINDLE AND TOOL HOLDER REFINISHER

RELATED APPLICATION

This application claims the benefit of U.S. Provisional Patent Application Ser. No. 62/091,156, filed on Dec. 12, 2014, the disclosure of which is entirely incorporated herein by reference.

TECHNICAL FIELD

The present invention relates generally to machine tools and, in particular, to a device for refinishing/restoring spindle bores and tool holders.

BACKGROUND ART

Machine tools, such as CNC machines, use a plurality of tools to produce a machined product. Cutting tools, such as end mills and drills, are automatically changed during a machining operation. The cutting tools are typically held in tool holders which are automatically installed and removed from machine spindles, as needed. In order to maintain precise tolerances, the tool holder must be rigidly held within the spindle. If relative movement occurs between the spindle and tool holder, machining errors will result and machining tolerances will be compromised.

A tool holder of the type to which this invention pertains, includes a tapered shank which is received in a complementally-shaped spindle socket. In order to maintain machine tolerances, it is critical that the tapered shank of the tool holder be in intimate and substantially full contact with the spindle socket. If the tool holder shank is not in full contact with the spindle socket, relative movement may occur, especially under heavy machining, which will produce wear in the tool holder shank or the spindle socket or both.

DISCLOSURE OF INVENTION

The present invention provides a new and improved method and apparatus for refinishing a spindle bore in a machine tool and a tool holder surface that is received by the spindle bore.

A spindle bore refinishing tool comprises a head and removable handle. The head includes three tapered segments which are configured to conform precisely to the taper of the spindle bore to be refinished. The segments are equally spaced and each include an arcuate upper surface that matches the taper of the spindle bore to be cleaned. An abrasive forms part of each upper surface, preferably in the form of abrasive strips. The abrasive strips are preferably self-adhesive strips and are removably attached to the surfaces. After attachment of the abrasive strips, the tool is inserted into the spindle bore and rotated several times, with a slight force applied. The tool is then removed and inspected. If imperfections remain in the spindle bore, these imperfection will be manifested as uneven wear patterns on the abrasive strips and/or transverse score lines created in the abrasive strips by the bore imperfections. The bore is then cleaned with a suitable solvent and spindle cleaning tool. The adhesive strips are then replaced with adhesive strips having a coarser grit and the tool is again reinserted and rotated within the spindle bore. If, after removal, the strips again show uneven wear or transverse score lines, the strips are replaced with strips of a coarser grit and the insertion and rotation steps are performed again. These steps are repeated until inspection of the refinishing tool reveals an even wear pattern on the abrasive strips and/or no transverse score lines.

According to the invention, a refinishing/restoration tool for restoring a precision tapered surface that forms part of a shank of a tool holder includes a refinishing head that defines at least three spaced apart tapered segments, extending between inner and outer annular portions. Each tapered segment defines a curved inner tapered surface, the configuration of the inner surface being related to the tool holder configuration, i.e., taper of the tool holder shank that is to be refinished. Each of the curved tapered surfaces carry an adhesive which, in the preferred and illustrated embodiment, is in the form of self-adhesive strips that are removably attached to the tapered surfaces of the segments. The tapered surfaces defined by the tapered segments collectively confront the tapered surface of the tool holder shank, when the tool holder shank is inserted into a cavity defined by the refinishing head. When the tool holder shank is inserted into the refinishing head, the abrasives carried by the tapered segments engage the tapered surface of the tool holder so that rotation of the refinishing head abrades the tapered surface of the tool holder.

According to a feature of the invention, the head for refinishing a tool holder taper also includes strengthening ribs that extend between the inner and outer annular portions. Preferably, the strengthening ribs are located intermediate adjacent tapered segments.

The method for refinishing a tool holder shank using the tool holder refinishing head is substantially similar to the method for refinishing the spindle bore. Suitable adhesive strips are mounted to the inner curved surfaces of the tapered segments and a shank of a tool holder is then inserted into the refinishing head whereupon the head is rotated to abrasively contact the tapered surface of the tool holder shank. The tool holder is then removed from the refinishing head and the abrasive strips are inspected to determine whether imperfections in the tool holder shank are present. If present, the step of engaging the refinishing head with the tapered surface is repeated with, if necessary, abrasive strips of different grits, until a desired surface finish for the tool shank is achieved.

According to a preferred embodiment, the refinishing head is machined entirely from steel bar stock or a steel billet. This feature results in a refinishing head that is substantially rigid and resists distortions during a refinishing operation which would otherwise compromise the surface finish of the tapered shank of the tool holder being refinished.

According to another feature of the invention, both the refinishing head for the spindle bore and the refinishing head for the tool holder include removable operating handles. In addition, both finishing heads utilize self-adhesive abrasive strips of various grits that can be used in order to arrive at a desired surface finish for the spindle bore or the tool holder shank tapered surface.

With the present invention, both the spindle bore of a machine tool and the tapered shank surface of a corresponding tool holder can be refinished or restored to substantially original specifications. With the disclosed invention, machining tolerances can be maintained without the need for expensive re-machining or replacement of the machine tool spindle and/or the tool holders used with the spindle.

Additional features of the invention will become apparent and a fuller understanding obtained by reading the following detailed description made in connection with the accompanying drawings.

BRIEF DESCRIPTION OF DRAWINGS

FIG. 3 is a perspective view of a spindle refinisher constructed in accordance with a preferred embodiment of the invention;

BEST MODE FOR CARRYING OUT THE INVENTION

Figure 1:
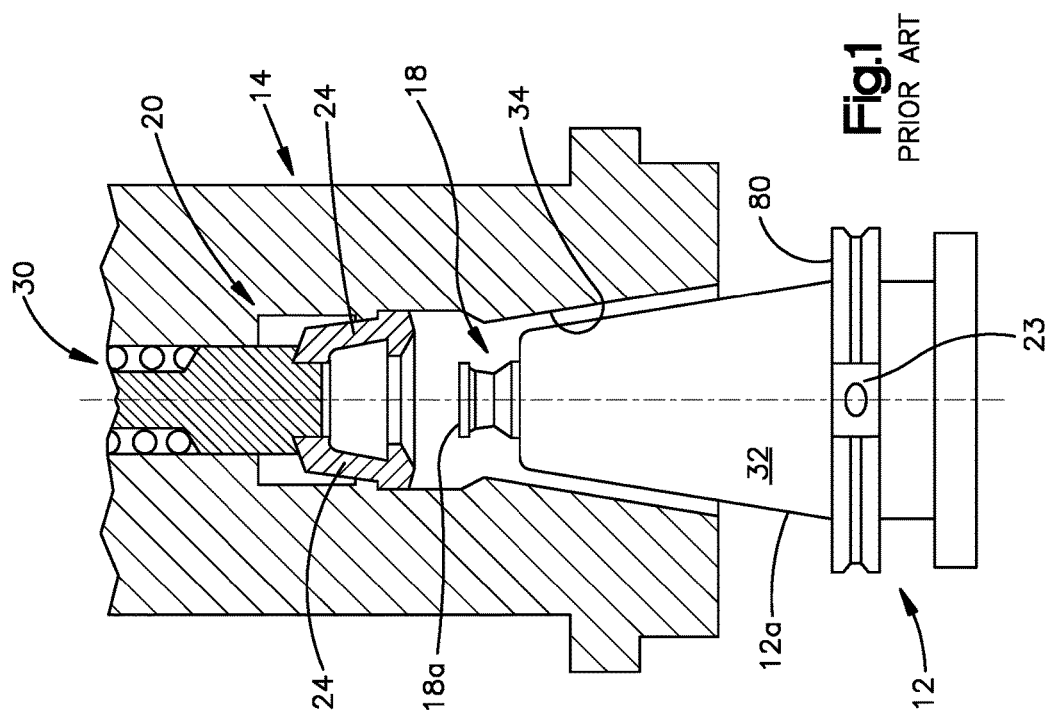
FIG. 1 is a fragmentary view of a machine tool spindle showing how a tool holder is held and in operative engagement with the spindle.

FIG. 1 illustrates a tool holder 12 and a spindle 14 with which the tool holder 12 is used. As is known, the tool holder 12 is used to mount replaceable machining tools such as cutters, drills, mills etc., in a machine tool such as a CNC machine. As seen in FIG. 1, the tool holder 12 is removably held in a spindle indicated generally by the reference 14 which forms part of the CNC machine. The tool holder includes a retention knob 18, which is generally threadably received in a bore formed in a shank 12a of the tool holder 12. The spindle 14 includes a gripper mechanism indicated generally by the reference character 20, which includes grippers 24 that are operative to grip a head 18a of the retention knob 18. The gripper assembly 20 draws the shank 12a of the tool holder 12 into the spindle 14 and rigidly couples the tool holder 12 to the spindle 14 such that rotation of the spindle causes rotation in the tool holder, and hence the machining tool (not shown) carried by the tool holder 12. The tool holder 12 is maintained in its operative position inside the spindle 14 by a spring or spring mechanism indicated generally by the reference character 30.

As seen in FIG. 1, the tool holder shank 12a includes a frustum-shaped or tapered mounting surface 32 that confrontingly engages a complementally shaped spindle bore or socket 34. The angle of the taper on the shank 12 is an industry standard. It should be noted, that several sized tapers are used in the industry. In the illustrated embodiment, the angle of the taper is 8.29714 degrees per side. This is also referred to as a 3.500" taper per foot, or 7/24 step taper or 8°17' 49.7" per side.

In order to provide precise machine intolerances, it is critical that the tapered surface 32 of the tool shank 12a have full contact with the tapered surface defined by the spindle socket 34. If full contact is not established, relative movement between the tool holder 12 and spindle 14 will occur, especially under heavy machining loads. This movement will produce machining errors and, thus, machine tolerances will not be maintained. It will also cause wear in the tool shank 12 and spindle 14 and reduce the life of the cutting tool.

Over time, particles, such as metal chips, grit, etc. may find their way into the spindle bore 34 and prevent full intimate contact between the tool holder shank and the bore. In addition, it has been found that slight imperfections or galling in the spindle bore 34 may be created over time as tool holders are installed and released by the spindle. Imperfections or galling may also be created in the tool shank tapered mounting surface 32a.

Figure 2:
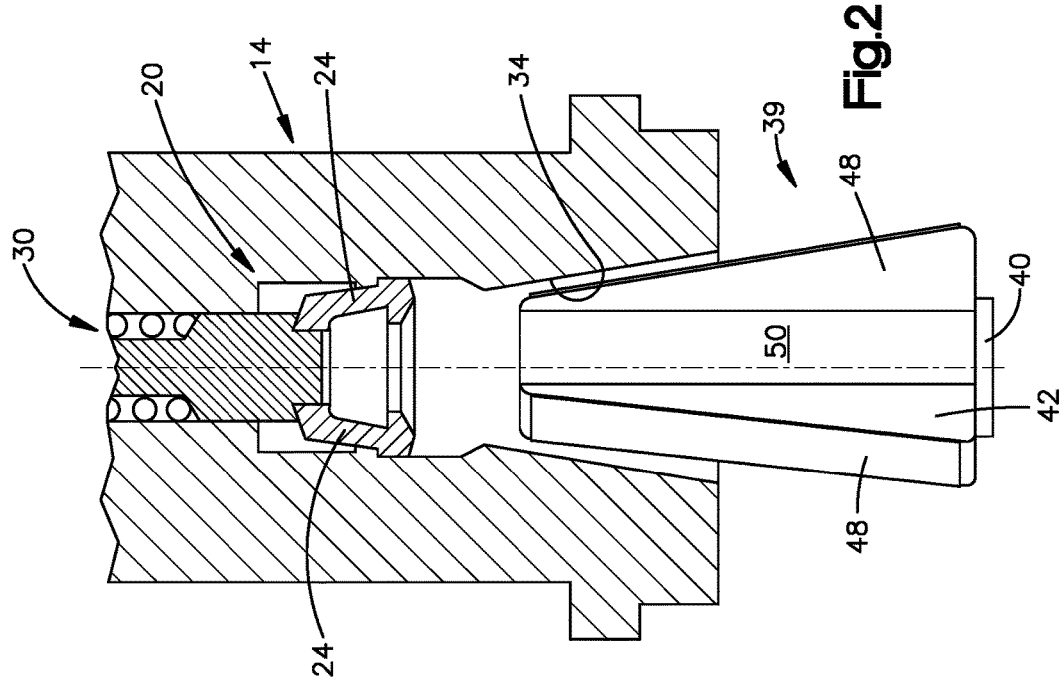
FIG. 2 is a fragmentary view of a machine tool spindle showing the insertion of a spindle refinishing tool constructed in accordance with a preferred embodiment of the invention.

Referring to FIGS. 2 and 3, a spindle refinisher 39 constructed in accordance with a preferred embodiment of the invention can be used to clean and refinish a spindle bore 39 in order to ensure intimate contact between the bore 34 and a tool holder 12 held in the bore.

As seen in FIG. 3, the spindle refinisher includes a handle 40 and a refinishing head 42. The handle may be threadedly coupled to the refinishing head 42 and, thus a single handle 40 can be used to mount several different refinishing heads.

The refinishing head 42 preferably includes three taper segments 48 which each have an inclined upper surface 48a. The taper segments are configured to conform and match the taper angle of the spindle bore 34. The upper surface 48a is arcuate to conform to the conical surface defined by the spindle bore 34.

In accordance with the invention, abrasive strips 50 are attached to each taper segment 48. In the preferred embodiment, the abrasive strips 50 are self-adhesive strips so that they can be easily installed and removed from the surface 48a of an associated taper segment 48.

According to the preferred method of using the refinisher 39, an abrasive strip 50 having a selected grit is attached to the upper surface 48a of each taper segment 48. The tool 39 is then inserted into the spindle bore 34 and rotated to allow the abrasive strips 80 to clean up or abrade the bore 34. Alternately, the spindle is engaged and power rotated at 60-80 R.P.M. The bore 34 is then cleaned with a suitable solvent and cleaning implement to remove all traces of the grit and particles loosened by the rotation of the tool 39.

The tool 39 is then inspected. Horizontal witness lines on the abrasive strips are an indication that a substantial imperfection in the spindle bore 34 is present. If this is the case, the abrasive strips 48 are replaced with abrasive strips having a coarser grit and the tool 39 is again inserted into the bore 34 and either the tool 39 is rotated or the spindle is rotated. After several rotations, the tool is removed and the strips are again inspected for indications that surface imperfections still exist as manifested by transverse lines in the strips or uneven wear. Again, if transverse lines are present, the abrasive strips are replaced with abrasive strips having a coarser grit and, again, inserted into the bore and rotated. The steps are repeated until the abrasive strips no longer show any signs of imperfections in the bore, i.e., transverse score lines on the face of the abrasive strip. Imperfections in the surface finish of the bore will manifest itself as score lines on one or more of the abrasive strips. This operation can be repeated many times by strips of different grit sizes until the spindle bore 34 is fully cleaned to a desired surface finish. The bore is considered refinished, if inspection of the tool, after rotating the tool 39 or spindle produces an even wear pattern on the abrasive strips and no score lines.

More specific restoration method steps are set forth below:

1. Turn off machine.
2. Clean the spindle using cleaning implement and/or suitable cleaner.

3. Make sure all degreaser has been removed from the spindle and the spindle is dry.
4. Apply the finest grit strip onto refinisher head by peeling off backing and pressing strip firmly on the upper surfaces 48a of the refinishing head 42. Repeat this process for remaining two taper segments 48.
5. Engage the spindle to 60 to 90 R.P.M. Insert the refinishing head 42 into the spindle. Apply direct force into the spindle and allow the spindle to make 6 to 8 complete revolutions.
6. Remove the head 42 and examine grit strips 50. If there is heavy/uneven wear on the grit strips 50, debris and build up remain in the spindle. Remove the grit strips from the head 42. Apply new grit strips 50, using the next coarsest grit.
7. Repeat steps 5-6 until grit strips 50 show an even wear pattern and debris and build-up have been removed from the spindle.
8. Make sure the machine is off and the spindle has come to a complete stop. Clean the spindle one final time.

Figure 4:
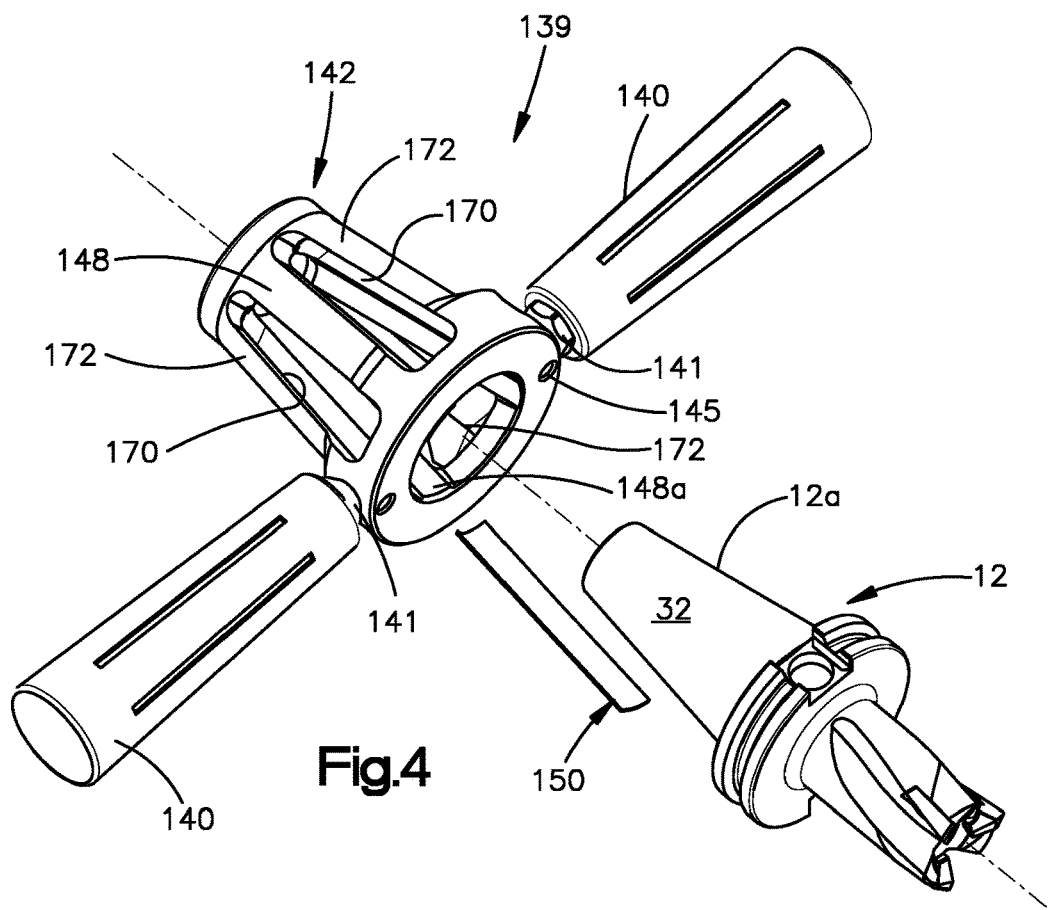
FIG. 4 is a perspective view of a tool holder refinisher constructed in accordance with a preferred embodiment of the invention.
Figure 4A:
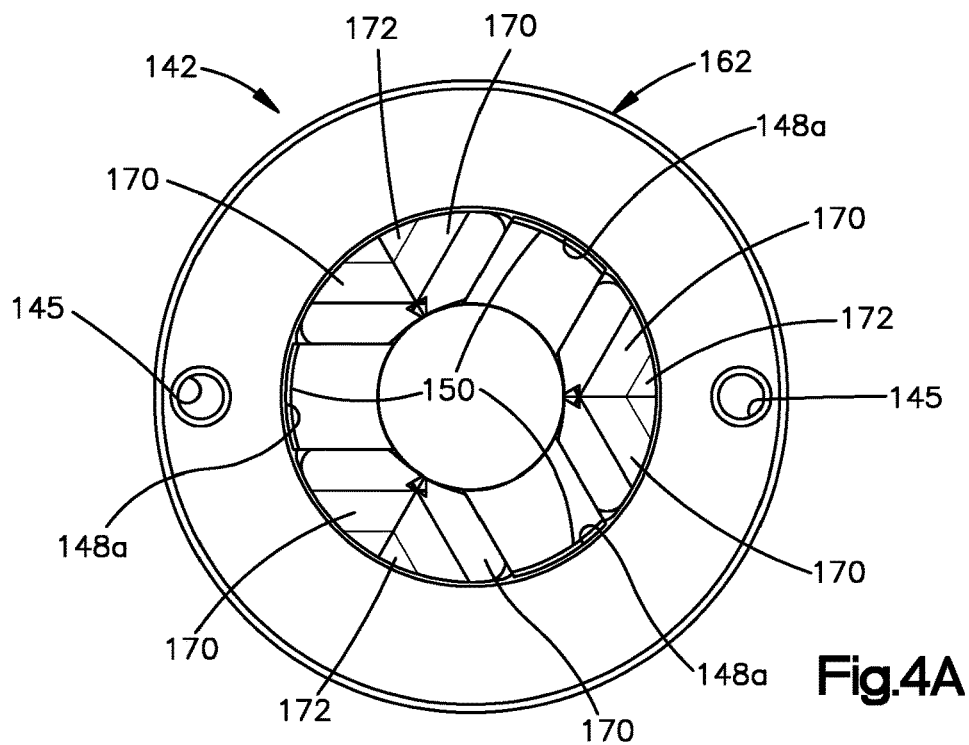
FIG. 4A is a front elevational view of a tool holder refinishing head forming part of the tool shown in FIG. 4.
Figure 5:
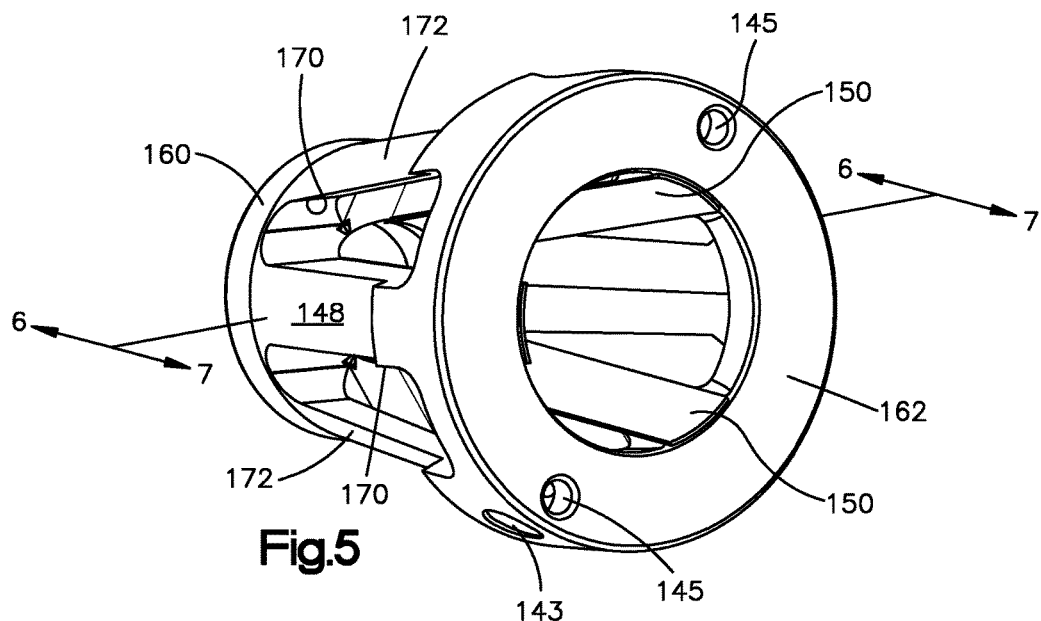
FIG. 5 is a perspective view of a tool holder refinisher head forming part of the tool shown in FIG. 4.

FIGS. 4-7 illustrate the construction of a tool shank refinisher 139 constructed in accordance with a preferred embodiment of the invention. As seen best in FIG. 4, the refinisher 139 includes a refinishing head 142, which, as will be explained below, is configured to accept the tapered surface 32 of a tool holder shank 12a of a tool holder 12. As indicated above, the tool holder 12 is of conventional construction. In the preferred and illustrated embodiment, the tool holder refinisher includes a pair of operating handles 140 which are threadedly attached to the refinishing head 142. Referring also to FIG. 4A and FIG. 5, in the illustrated embodiment, the operating handles 140 are threadedly attached to the refinishing head 142 by threaded studs 141. Each threaded stud 141 includes a threaded segment which is threadedly received by an associated handle 140 and another threaded end that is threadedly received by an associated threaded bore 143 (shown best in FIG. 5), defined and machined in the refinishing head 142. Set screws received in axial bores 145 lock the studs to the refinishing head 142 and inhibit reverse rotation of the studs 141.

Figure 6:
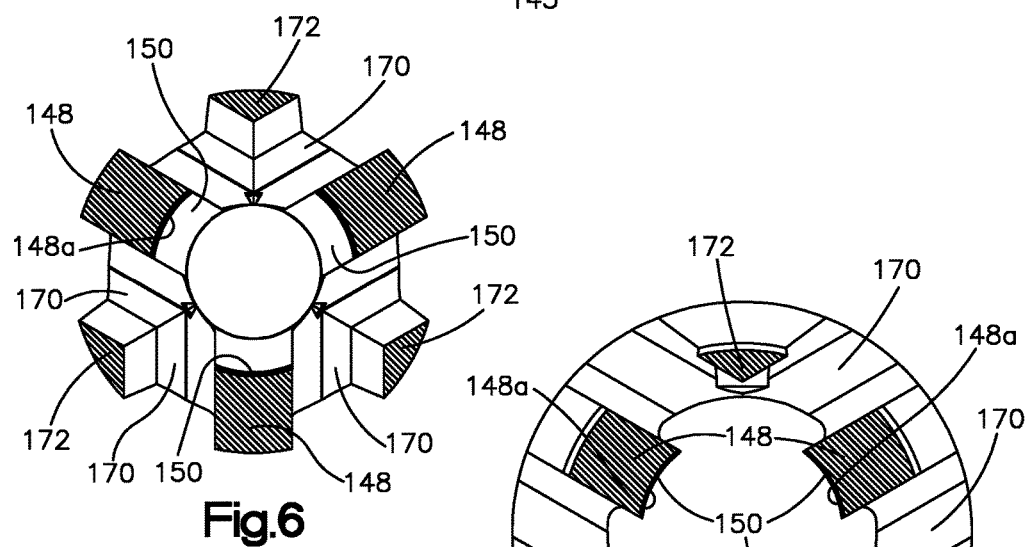
FIG. 6 is a sectional view of the tool holder refinishing head as seen from the plane indicated by the line 6-6 in FIG. 5.
Figure 7:
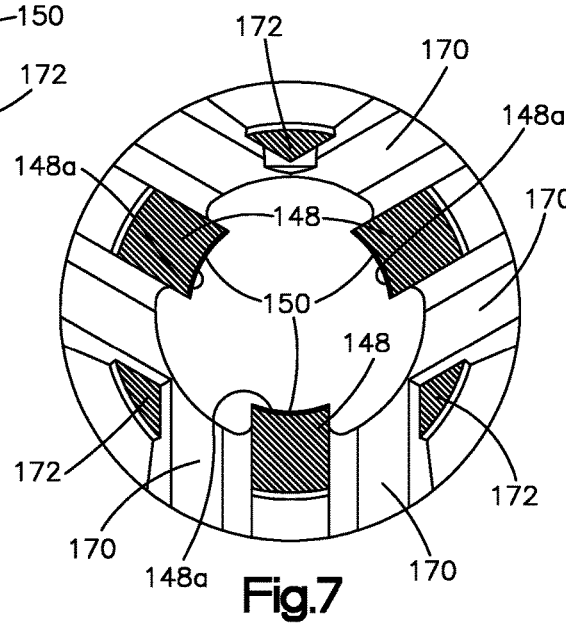
FIG. 7 is another cross-sectional view of the tool holder refinishing head as seen from the plane indicated by the line 7-7 in FIG. 5.

Referring also to FIGS. 6 and 7, the refinishing head 142 is preferably machined from steel bar stock or a steel billet and is a very rigid structure so that during a refinishing operation, the refinishing head substantially resists deformation.

The refinishing head 142 includes spaced apart annular portions 160, 162. In the preferred embodiment, three tapered segments 148, which each define an inner curved surface 148a extend between the annular portions 160, 162. The surfaces 148a are configured to conform to the tapered shank surface 32 of the tool holder to be refinished. These three segments collectively define a cavity in the refinishing head for receiving the shank 12a of the tool holder 12. The cavity defines a segmented tapered surface that conforms to the tapered surface of the tool holder shank 12a to be refinished. The segments 148, in effect, perform the same function as the tapered segments 48 defined by the spindle refinisher 39. As indicated above, the segments 148 are preferably spaced 120° apart. The inner curved surface 148a defined by each segment 148 is adapted to receive an abrasive strip 150, which may be the same or similar to the strip 50 used in connection with the spindle refinisher 39.

In the preferred method for machining the refinishing head 142, a plurality of oblong slots 170 are machined into the bar stock or billet from which the refinishing head is to be made. As seen best in FIG. 6, six oblong slots 170 are preferably machined into the billet. A seen best in FIGS. 6 and 7, two adjacent slots 170 define an associated taper segment 148. The slots 170 also form and define rigidizing ribs 172 which extend between the annular portions 60, 62. As a result of this method for machining the billet, three equally spaced rigidizing ribs 172 are formed, each rib located between adjacent tapered segments 148. In the preferred construction, the combination of the tapered segments and rigidizing ribs 172 provide a refinishing head which is substantially rigid and resists distortions in the refinishing head 142 during a refinishing operation.

The refinishing operation used to clean up a tapered surface 32 of a tool holder shank 12a, is similar to the operation used to clean up the spindle bore 39, using the refinisher tool 39. In particular, abrasive strips 150 are attached to the inner surface 148a of each tapered segment 148. The abrasive strips 150 are also preferably self-adhesive so that they can be easily installed and removed from the surface 148a of an associated taper segment 148. According to the preferred method of using the refinisher 139, abrasive strips 150 having a selected grid are attached to the inner surfaces 148a of each taper segment 148. A tool holder shank 12a having a taper surface 32 to be refinished is inserted into the cavity of the tool holder refinisher head 142 until contact between the tool holder surface 32 and abrasive strips 150 is made. The refinisher head 142 is then rotated using the operating handles 140. The invention also contemplates the refinisher head 142 being power rotated, as was disclosed in connection with the refinishing tool 39.

The refinisher head 142 is then inspected to determine whether horizontal witness lines are present in any of the abrasive strips 150, which would indicate that an imperfection in the tool holder surface 12a is present. As disclosed in connection with the spindle bore refinisher 39, abrasive strips 150 having a coarser grit can be used to clean up the tapered surface 32. As indicated above, this cleanup operation can be repeated many times by strips of different grid sizes until the tapered surface 32 of the tool holder is cleaned to a desired surface finish. The tapered surface 32 would be considered refinished, if inspection of the tool, after rotating the tool 139 produces an even wear pattern on the abrasive strips and no score lines.

More specific, restoration/refinishing method steps are set forth below:
1. Before beginning the resurfacing process, the holder should be cleaned with a heavy-duty degreaser or with an ultrasonic cleaner to remove the oil, dirt, and hardened grease and cutting fluids.
2. a) To begin resurfacing the cleaned holder, install the handles into the restoration head and tighten the set screws.
   b) Inspect the toolholders condition. A holder that has uneven wear patterns, but is not nicked or dented, can be considered to be in moderate condition. This holder requires the 40 mic (320 grit) abrasive. A holder that is nicked or dented is in poor condition and requires the 60 mic (220 grit) abrasive.
   c) Install the correct pre-cut abrasive strips into the cavity of the restoration head.
   d) First, remove the plastic film covering the adhesive material from the back of the abrasive strips. Line up the strip, press it against the end of the flange, bend the strip down into the taper, and then press it firmly against the interior surface of the taper. Three strips of the same grit should be applied in this manner.
3. Insert the toolholder into a holding fixture. Make sure it is securely locked in place.
4. a) Place the restoration head over the taper.

b) While pressing down hard on the handles, turn the resurfacing head three revolutions and exert at least 5 pounds of pressure for a 30 taper, 15 pounds for a 40 & 45 taper, and 30 pounds for a 50 & 60 taper.

c) Remove the head, clean the surface of the taper and the inside of the restoration head with a lint-free towel to remove debris, and inspect the finish on the toolholder's taper. If it requires more refinishing, replace the head on the toolholder and repeat this process until the taper surface is free of any raised material.

5. a) Inspect the taper. If all of the built-up material has been removed, there will be an even wear pattern over the surface of the holder from the small end to the gage line.

b) If the holder had nicks, gouges, or dents, the wear pattern will be uniform up to those flaws.

6. a) If a finer finish is required, remove the present strips from the resurfacing head and replace them with the next finer grit strips.

b) Place the head over the toolholder once more, and turn the head three revolutions.

c) Remove the resurfacing head.

7. a) Remove the toolholder from the holding fixture b) Wipe it down one last time c) Oil it to deter rust It should be noted here, that the invention also contemplates a tool surface refinishing tool and method in which the refinishing head 142 is held stationary and the tool holder 12 is inserted and then rotated relative to the refinishing head 139.

The apparatus and method for refinishing the tapered surface of a tool holder is substantially similar to the method for refinishing a spindle bore. The same or similar method steps disclosed in connection with the spindle bore refinisher may be employed to clean up a tool holder shank surface.

A list of suitable abrasive materials that are available from 3M Company and which can be used as the abrasive strips 50, 150*a* are listed in Table 1 below. The materials listed in the Table all use aluminum oxide as the abrasive.

LIST OF ABRASIVE MATERIALS AVAILABLE
FROM 3M COMPANY

| 3M PART NUMBER | DESCRIPTION | GRADE | MINERAL |
| --- | --- | --- | --- |
| 60-0001-2078-6 | 268L Microfinishing Film | 15 Mic | Aluminum Oxide |
| 60-0001-2023-6 | 268L Microfinishing Film | 40 Mic | Aluminum Oxide |
| 60-0001-2022-4 | 268L Microfinishing Film | 30 Mic | Aluminum Oxide |
| 60-0001-2025-7 | 268L Microfinishing Film | 60 Mic | Aluminum Oxide |

It should be noted, however, that other abrasive materials and substrates can be used as part of or formed into the abrasive strips 50, 150*a*. These other materials include silicon carbide, diamond lapping film and diamond microfinishing film. These materials are also available from 3M Company and other abrasive suppliers.

Although the invention has been described with a certain degree of particularity, those skilled in the art can make various changes to it without departing from the spirit or scope of the invention as hereinafter claimed.

The invention claimed is:

1. A tool for refinishing a machine tool component having a taper comprising:
   a) a head;
   b) said head defining three tapered segments which are configured to conform precisely to the taper of the machine tool component to be refinished;
   c) each segment including a surface for adhesively receiving a flexible abrasive strip that conforms to said surface, said surfaces configured to conform and confront a conical surface of said taper to be refinished forming part of said machine tool component;
   d) said head adapted to engage said conical surface of said machine tool component, such that, upon engaging said component, rotation of said head abrades the surface of said conical surface of said component.

2. The apparatus of claim 1 wherein said machine tool component is a spindle and said head is used to refinish a machine tool bore in said spindle.

3. The apparatus of claim 1 wherein said machine tool component comprises a tool holder and said head is used to refinish a conical shank defined by said tool holder.

4. Apparatus for refinishing a spindle bore of a machine tool, comprising:
   a) a head portion defining three outwardly extending, tapered segments;
   b) each segment including a curved tapered surface which is related to the taper of said spindle bore;
   c) said curved surfaces of said segments collectively defining a rotational surface that conforms to said spindle bore taper;
   d) each of said curved tapered surfaces receiving an abrasive, such that when said refinishing head is inserted into said spindle bore, said abrasive on said tapered surfaces abrasively engage said spindle bore surface so that rotation of said head abrades said spindle bore surface;
   e) said abrasive comprises flexible abrasive strips which are adhesively secured to said curved tapered surfaces whereby said abrasive strips closely conform to said curved tapered surfaces.

5. The apparatus of claim 4 wherein said apparatus includes a handle by which is said head is rotated when said head is inserted into said spindle bore.

6. The apparatus of claim 4 wherein said segments are spaced 120° apart.

7. An apparatus for refinishing a tapered shank of a tool holder comprising:
   a) a refinishing head defining three spaced apart tapered segments extending between inner and outer annular portions;
   b) each tapered segment defining a curved inner taper surface, the configuration of said surface being related to the configuration of said tool holder shank that is to be refinished;
   c) each of said curved tapered surfaces carrying a removable flexible abrasive strip, said strip adhesively secured to and conforming to said associated curved tapered surface;
   d) said taper surfaces configured such that collectively said surfaces confront a taper surface of said tapered tool holder when said tool holder shank is inserted into said refinishing head so that said abrasive strips carried by said segments engage said tapered surface of said tool holder so that rotation of said refinishing head abrades said tapered surface of said tool holder.

8. The apparatus of claim 7 further comprising strengthening ribs extending between said inner and outer annular portions.

9. The apparatus of claim 8 wherein said ribs are located intermediate adjacent tapered segments.

10. The apparatus of claim 7 wherein said refinishing head is machined entirely from steel bar stock.

11. The apparatus of claim 7 wherein said curved inner tapered surfaces together define a cavity for receiving said tool holder shank.

12. The apparatus of claim 10 wherein said three spaced apart tapered segments are formed in said refinishing head by machining oblong slots in said steel bar stock.

13. A method for refinishing a machine tool component having a tapered surface, comprising:
   a) providing a refinishing head having three tapered segments, each segment having a segment surface carrying an abrasive, said segment surfaces arranged to conform to the tapered surface of said machine tool to be refinished;
   b) engaging said segments with the tapered surface of machine tool to be refinished;
   c) rotating said refinishing head while said head engages said machine tool component so that said abrasives abrades the tapered surface of said machine tool;
   d) disengaging said head from said machine tool component and inspecting said abrasives for witness lines in order to determine whether said machine tool component requires further refinishing;
   e) if said machine tool component needs further refinishing, reengaging said head with said machine tool component and again rotating said head to abrade the surface of said machine tool component.

14. The method of claim 13 further comprising repeating steps d) and e) of claim 13 until a predetermined surface finish is obtained on the machine tool surface to be refinished.

15. The method of claim 14 wherein a grit size for said abrasives is changed after said step d) of claim 13.

16. The method of claim 13 wherein said refinishing head includes three outwardly extending segments that are abrasively engageable with a spindle bore.

17. The method of claim 13 wherein said refinishing head includes three inwardly extending tapered segments which are adapted to abrasively engage a tapered shank of a machine tool holder.

* * * * *